(12) United States Patent
Jew

(10) Patent No.: US 10,452,310 B1
(45) Date of Patent: Oct. 22, 2019

(54) VALIDATING CABLING FOR STORAGE COMPONENT ADMISSION TO A STORAGE ARRAY

(71) Applicant: Pure Storage, Inc., Mountain View, CA (US)

(72) Inventor: Warren W. Jew, Foster City, CA (US)

(73) Assignee: Pure Storage, Inc., Mountain View, CA (US)

( * ) Notice: Subject to any disclaimer, the term of this patent is extended or adjusted under 35 U.S.C. 154(b) by 117 days.

(21) Appl. No.: 15/209,611

(22) Filed: Jul. 13, 2016

(51) Int. Cl.
*G06F 3/06* (2006.01)

(52) U.S. Cl.
CPC .......... *G06F 3/0653* (2013.01); *G06F 3/0607* (2013.01); *G06F 3/0632* (2013.01); *G06F 3/0683* (2013.01)

(58) Field of Classification Search
CPC .... G06F 3/0653; G06F 3/0607; G06F 3/0632; G06F 3/0683
See application file for complete search history.

(56) References Cited

U.S. PATENT DOCUMENTS

| | | | |
|---|---|---|---|
| 5,706,210 A | 1/1998 | Kumano et al. | |
| 5,799,200 A | 8/1998 | Brant et al. | |
| 6,647,514 B1 | 11/2003 | Umberger et al. | |
| 6,748,510 B1 * | 6/2004 | Coatney | G06F 11/0727 710/8 |
| 6,789,162 B1 | 9/2004 | Talagala et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,689,609 B2 | 3/2010 | Lango et al. | |
| 7,743,191 B1 | 6/2010 | Liao | |
| 8,042,163 B1 | 10/2011 | Karr et al. | |
| 8,086,585 B1 | 12/2011 | Brashers et al. | |
| 8,387,136 B2 | 2/2013 | Lee et al. | |
| 8,465,332 B2 | 6/2013 | Hogan et al. | |

(Continued)

FOREIGN PATENT DOCUMENTS

WO    WO 2013071087 A1    5/2013

OTHER PUBLICATIONS

NetApp. Clustered Data ONTAP 8.3. [online], [retrieved on Sep. 17, 2018]. Retrieved from the Internet <URL: https://library.netapp.com/ecm/ecm_download_file/ecmp1636022> (Year: 2015).*

*Primary Examiner* — Larry T Mackall
(74) *Attorney, Agent, or Firm* — Womble Bond Dickinson (US) LLP

(57) ABSTRACT

A method for validating cabling for storage component admission to a storage array is provided. As a part of the method, in response to a coupling of a storage element to the storage array, a current cabling arrangement of the storage array is accessed and the current cabling arrangement of the storage array is compared with a stored cabling configuration of the storage array. If the current cabling arrangement is compatible with the stored cabling configuration, at least one storage component of the storage element is admitted to the storage array. If the current cabling arrangement is incompatible with the stored cabling configuration, admission of the at least one storage component of the storage element to the storage array is denied and the cabling that is incompatible with the stored cabling configuration is identified.

20 Claims, 6 Drawing Sheets

(56) References Cited

U.S. PATENT DOCUMENTS

| | | |
|---|---|---|
| 8,578,442 B1 | 11/2013 | Banerjee |
| 8,613,066 B1 | 12/2013 | Brezinski et al. |
| 8,620,970 B2 | 12/2013 | English et al. |
| 8,762,642 B2 | 6/2014 | Bates et al. |
| 8,769,622 B2 | 7/2014 | Chang et al. |
| 8,800,009 B1 | 8/2014 | Beda, III et al. |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,209,973 B2 | 12/2015 | Aikas et al. |
| 9,300,660 B1 | 3/2016 | Borowiec et al. |
| 2003/0225961 A1 | 12/2003 | Chow et al. |
| 2004/0080985 A1 | 4/2004 | Chang et al. |
| 2004/0103327 A1* | 5/2004 | Dake .................. G06F 1/26 713/300 |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2007/0022227 A1 | 1/2007 | Miki |
| 2007/0028068 A1 | 2/2007 | Golding et al. |
| 2007/0150689 A1 | 6/2007 | Pandit et al. |
| 2007/0220227 A1 | 9/2007 | Long |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2009/0100115 A1 | 4/2009 | Park et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0167221 A1 | 7/2011 | Pangal et al. |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0311434 A1 | 11/2013 | Jones |
| 2013/0332614 A1 | 12/2013 | Brunk et al. |
| 2014/0020083 A1 | 1/2014 | Fetik |
| 2014/0032727 A1* | 1/2014 | Kano .................. H04L 67/1097 709/223 |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0149822 A1 | 5/2015 | Coronado et al. |
| 2015/0378888 A1 | 12/2015 | Zhang et al. |
| 2016/0098323 A1 | 4/2016 | Mutha et al. |
| 2017/0235802 A1* | 8/2017 | Vully .................. G06F 16/119 707/809 |

\* cited by examiner

VALIDATING CABLING FOR STORAGE COMPONENT ADMISSION TO A STORAGE ARRAY

BACKGROUND

The term storage management encompasses the technologies and processes organizations use to maximize or improve the performance of their data storage resources. It is a broad category that includes but is not limited to virtualization, replication, mirroring, security, compression, traffic analysis, process automation, storage provisioning, and related techniques. However, storage management also involves maintaining the operability of data storage resources by means such as maintaining the cabling of data storage components.

BRIEF DESCRIPTION OF THE DRAWINGS

The embodiments, together with further advantages thereof, may best be understood by reference to the following description taken in conjunction with the accompanying drawings in which.

It should be noted that like reference numbers refer to like elements in the figures.

DETAILED DESCRIPTION

Figure 1:
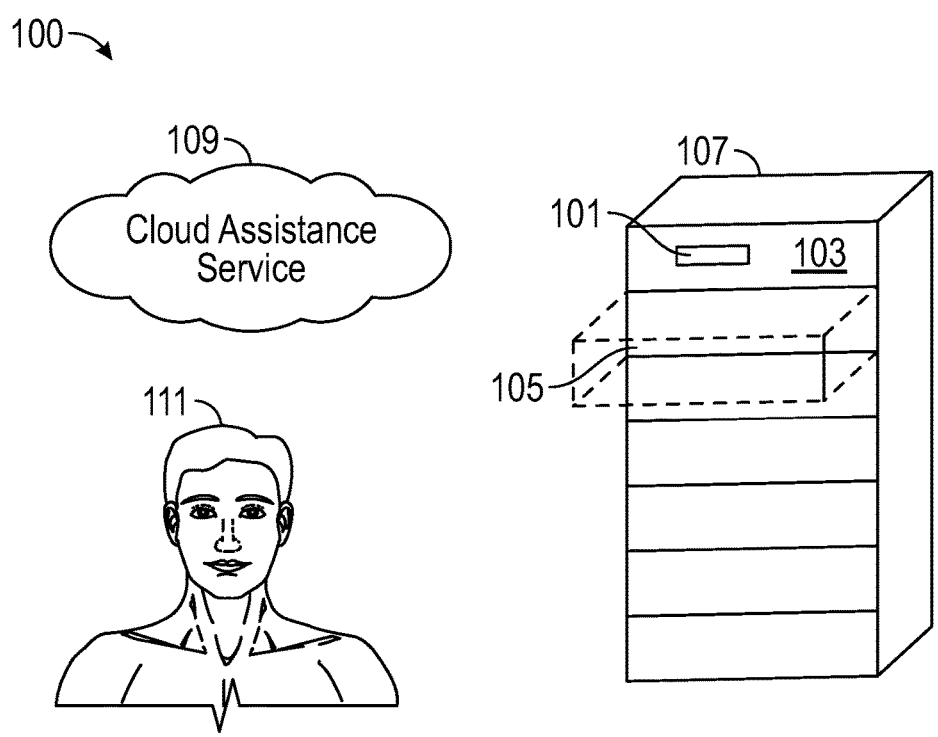
FIG. 1 shows an exemplary operating environment of a system for validating cabling for storage component admission to a storage array in accordance with some embodiments.

In the following detailed description, numerous specific details such as specific method orders, structures, elements, and connections have been set forth. It is to be understood however that these and other specific details need not be utilized to practice embodiments of the present embodiment. In other circumstances, well-known structures, elements, or connections have been omitted, or have not been described in particular detail in order to avoid unnecessarily obscuring this description.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

References within the specification to "one embodiment" or "an embodiment" are intended to indicate that a particular feature, structure, or characteristic described in connection with the embodiment is included in at least one embodiment of the present embodiments. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present embodiments, discussions utilizing terms such as "accessing" or "comparing" or "configuring" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices. As used herein the term storage element is intended to refer to a housing in which one or more storage components (e.g., solid state drives (SSDs)) reside.

The embodiments provide for validation of cabling prior to admitting storage components of a storage element into a storage array. For example, a storage shelf having a plurality of SSDs may be added to expand an existing capacity or upgrade a storage array, such as an all flash storage array. As part of the installation of the storage shelf, the cabling arrangement detected for the installed storage shelf can be compared to a cabling configuration for the particular version/model of the storage array to determine if the SSDs of the storage shelf are admitted to the array. It should be appreciated that the embodiments may be extended to initial installations of a storage array as well as upgrades or addition of capacity to an existing storage array.

In some embodiments, the controller for the storage array may be able to see/access the SSDs of the newly added storage shelf but determine that the cabling is not optimal or that a previously installed storage shelf has an incorrect or suboptimal cabling arrangement. The system will return a message to alert the user that the cabling needs to be adjusted. The alert can take many forms such as visual alerts, audible alerts, etc. As described below, a report displayed on a graphical user interface may specify a slot/port is coupled to an incorrect input/output module (IOM). In some embodiments, a software tool provided through the storage array or through the cloud will automatically execute prior to admittance of the SSDs of a storage shelf to the array or upon detection of a storage element, such as a storage shelf, being coupled to an array. In some embodiments, the software tool may be executed through a command line interface or graphical user interface.

The storage array may utilize the serial attached small computer system interface (SAS) protocol to move data to and from storage devices in some embodiments. However, the embodiments are not limited to SAS cabling as the embodiments may be extended to any other suitable protocol and cabling configuration for coupling storage devices, such as serial AT attachment (SATA), parallel small computer system interface (parallel SCSI), etc.

FIG. 1 shows an exemplary operating environment 100 of a system 101 for validating cabling for storage component admission to a storage array. System 101 is configurable to compare a current cabling arrangement of a storage element to a stored cabling configuration of a storage array (a predetermined cabling configuration that is expected). The stored cabling configuration can be a data file stored within the storage array or on a cloud service associated with the storage array. The comparison of the cabling arrangement can be made in order to validate proper cabling of a storage element (e.g., a shelf, blade, slot-in drive, or other type form factor) and to determine if one or more storage components of the storage element are to be either admitted or denied admission to the storage array. In addition, if incorrect cabling is found, the incorrect cabling can be identified. Denying the admission of storage components of a storage element that are improperly cabled to a storage array, ensures the avoidance of a cabling configuration that doesn't function correctly for high availability operation and/or fails to function for addition upgrades (e.g., addition upgrades such as non-disruptive controller upgrades). In some embodiments the cabling may be identified as non-optimal and the non-optimal cabling may be identified. FIG. 1 shows system 101, storage array controller 103, storage elements 105, storage array 107, cloud assistance service 109 and technician 111.

Still referring to FIG. 1, storage array 107 is a data storage system that stores data on multiple devices and includes storage array controller(s) 103 and one or more storage elements 105. In one embodiment, system 101 can be a part of an operating system of controller 103 or can be separate from the operating system of controller 103 but can work cooperatively therewith (for example as a part of separate software or firmware with components that operate on controller and/or on other devices or components of storage array 107). In one embodiment, system 101 can perform a cable diagnostics check that includes, as described above, comparing a current cabling arrangement of a storage element 105 to a stored cabling configuration of storage array 107 in order to determine if one or more storage components of storage element 105 are to be admitted or denied admission to storage array 107. In one embodiment, as a part of the cable diagnostics check, a current cabling arrangement is accessed in response to a coupling of storage element 105 to storage array 107. In addition, a stored cabling configuration of storage array 107 is accessed. In one embodiment, if the current cabling arrangement is compatible (e.g., the current cabling arrangement is consistent with, matches and/or is optimal) with the stored cabling configuration, at least one storage component of storage element 105 can be admitted to storage array 107. However, if the current cabling arrangement is incompatible or non-optimal with the stored cabling configuration, admission of the at least one storage component of storage element 105 to storage array 107 is denied. In one embodiment, the cabling that is incompatible with the stored cabling configuration can be identified. Tables 1 and 2 provided below show examples of diagnostic information related to a cabling configuration upon which, admission, or denial of admission, of the at least one storage component of storage element 105 can be based according to one embodiment.

Figure 2A:
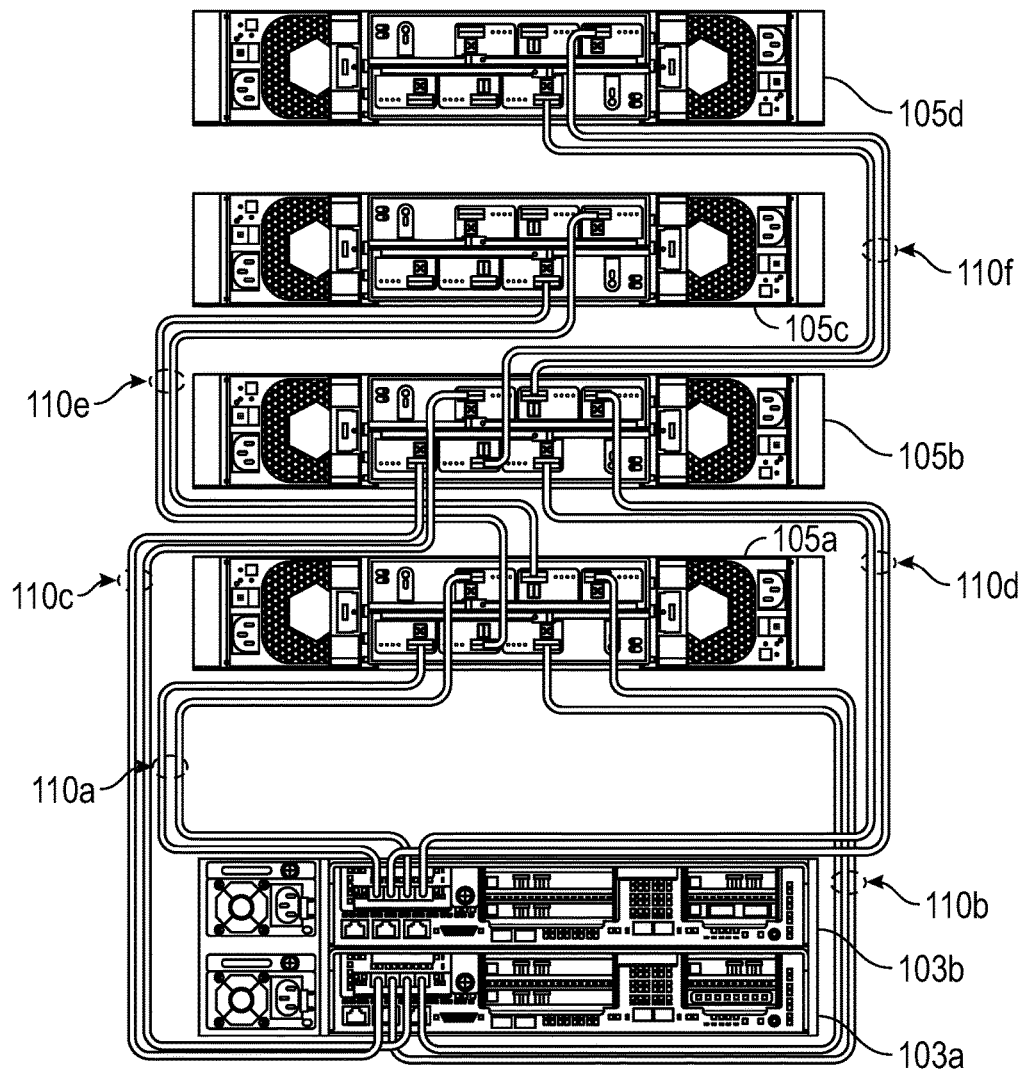
FIGS. 2A and 2B illustrate cabling arrangements for coupling storage elements and a storage controller in accordance with some embodiments.
Figure 2B:
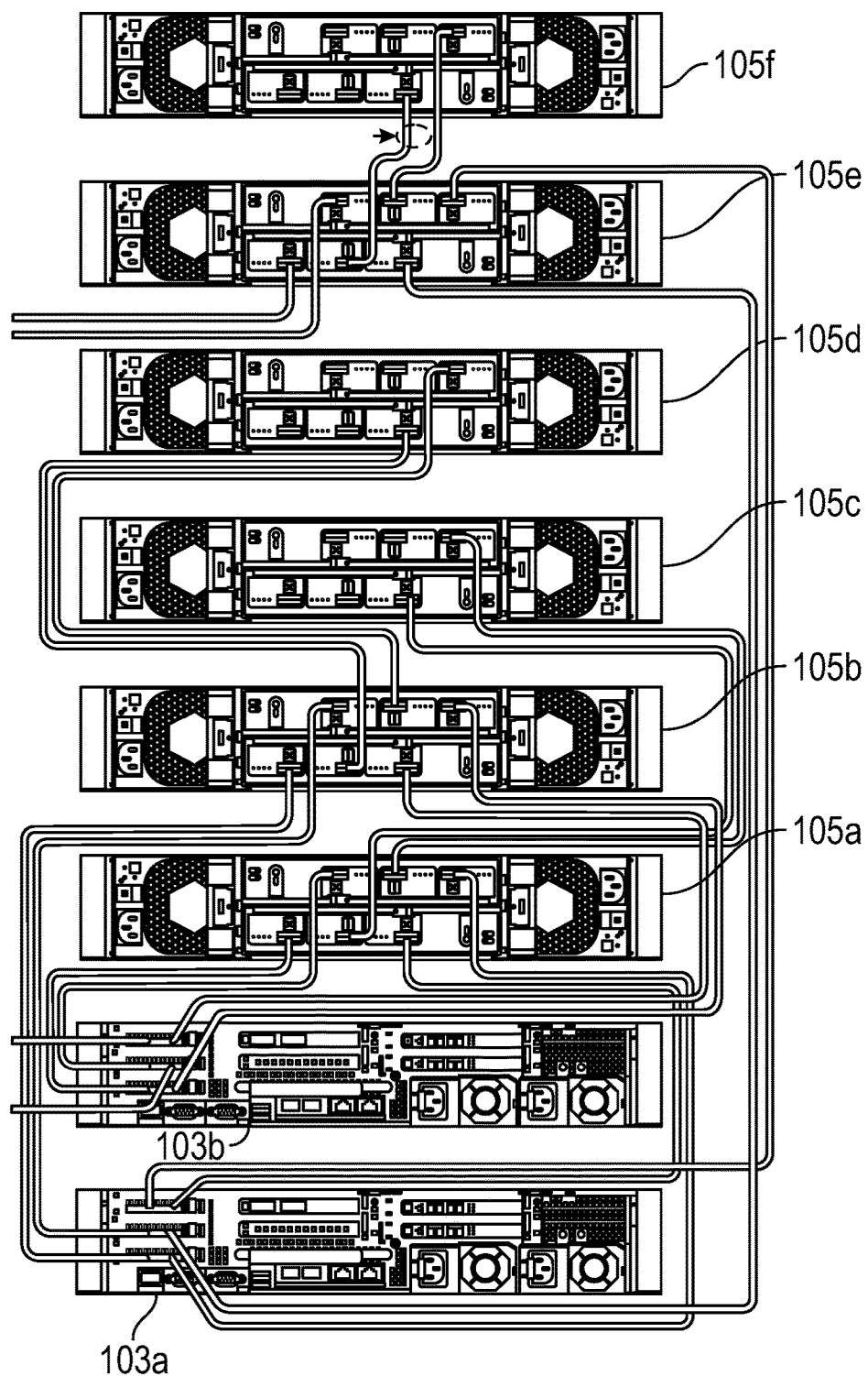

FIGS. 2A and 2B illustrate cabling arrangements for coupling storage elements and a storage controller in accordance with some embodiments. The cabling arrangement for FIG. 2A provides for the coupling between controllers 103a and 103b and storage elements 105a-d. The cabling arrangement for FIG. 2B illustrates the coupling between controllers 103a and 103b and storage elements 105a-f. In some embodiments, the cabling instructions may provide for the pairs of cables to be connected in a certain order. For example, cable pair 110a may be indicated to couple first and then cable pair 110b may be indicated to be coupled second and so on through 110c-f until the cabling is completed. Once the cabling is completed a computer program script may be executed from a command line interface or graphical user interface to validate the cabling arrangement and admit new/additional SSDs as described further below.

The functionality described herein may be embodied as software, hardware, firmware or some combination and can reside internally and/or externally to the storage system. The functionality may be incorporated as a software tool that provides information about the current state of the topology and any protocols moving data to and from storage components of the storage system. In some embodiments, subcommands provide for the checking of cabling, enclosures or storage elements that are visible, and the state of the connections for moving data to and from storage components. Additional subcommands may provide for examination of a controller and storage shelves or storage elements. The results of this examination can be compared to stored cabling configurations for the system, including any upgrades, so that a determination of whether the cabling configuration is compatible or incompatible with the storage system requirements can be made. Upon completion of the examination any errors found can be reported or if no configuration errors are found then that can be reported. TABLES 1 and 2 illustrate example reports which can be provided upon completion of this examination. As noted above, the software tool or script may be executed through a command line interface or graphical user interface.

Referring to Table 1 below, shown is exemplary diagnostic information related to a cabling configuration that indicates that errors in the cabling configuration have been found and in response to detecting the errors, admission of at least one component of a storage element (e.g., 105 in FIGS. 1 and 2) to a storage array (e.g., 107 in FIGS. 1 and 2) can be denied. In the Table 1 example, the information includes information related to start time, slot listing, slot summary, configuration status and end time. The information related to slot listing includes slot number, slot type, vendor, model, firmware revision, tracer, assembly, and slot ports. In other embodiments, other cabling information can be included. In the Table 1 example, the errors that are found are listed at the end of the diagnostic information and can be accessed by a technician according to one embodiment. In particular, specific cabling errors related to specific ports are detailed.

TABLE 1

Start time: 2014-01-23 00:06:08  
Command line:  ['/xxx/XXXXX/bin/sas_view.xy', 'config']  
Revision: 40000

Slot listing:

| Slot# | Type | Vendor | Model | FW Rev | Tracer | Assembly |
|---|---|---|---|---|---|---|
| 4 | SAS | XXX Logic | SAS4200-8e | 9.00.00.00 | SP22532388 | H3-25260-02C |
| 5 | SAS | XXX Logic | SAS4200-8e | 9.00.00.00 | SP22918023 | H3-25260-02C |

Slot summary information:  
s.p <--> I: ##.#:O <--> . . .

4.0] <---> [A:1.1:B*  
        \C] <---> [Unknown device 400505b0044ee2d0  
4.1] <---> [A:0.0:B*  
        \C] <---> [Unknown device 400505b0044ee2d4  
5.0] <---> [C:1.0:A] <---> [Unknown device 400505b0044ed6c0  
        \B*  
5.1] <---> [C:0.1:A] <---> [Unknown device 400505b0044ed6c4  
        \B*  
Configuration status Configuration check started for Storage Array 1  
Error information:

Slot 5, port 1: SAS HBA port is cabled to wrong enclosure component.  
Slot 4, port 1: SAS HBA port is cabled to wrong enclosure component.  
Slot 5, port 0: SAS HBA port is cabled to wrong enclosure component.  
Slot 4, port 0: SAS HBA port is cabled to wrong enclosure component.  
End time: 2014-01-23 00:06:08

Referring to TABLE 2 below, shown is an exemplary diagnostic information related to a cabling configuration that indicates that no errors in the cabling configuration have been found such that an admission of at least one component of a storage element (e.g., 105 in FIG. 1) to a storage array (e.g., 107 in FIG. 1) can be authorized.

TABLE 2

Start time: 2014-01-23 00:06:08  
Command line:  ['/xxx/XXXXX/bin/sas_view.yz', 'config']  
Revision: 40000

Slot listing:

| Slot# | Type | Vendor | Model | FW Rev | Tracer | Assembly |
|---|---|---|---|---|---|---|
| 4 | SAS | XXX Logic | SAS9200-8e | 9.00.00.00 | SP22532388 | H3-25260-02C |
| 5 | SAS | XXX Logic | SAS9200-8e | 9.00.00.00 | SP22918023 | H3-25260-02C |

Slot summary information:  
s.p <- -> I: ##.#:O <- -> . . .

4.0]*  
4.1] <---> [C:0.1:A*  
        \B*  
5.0*  
5.1] <---> [A:0.0:B*  
        \C*  
Configuration status Configuration check started for Storage Array 2

Error information:  
No errors detected  
End time: 2014-01-23 00:06:08

TABLES 1 and 2 are examples and not meant to be limiting as alternative report formats may be integrated with the embodiments. The first portion of TABLES 1 and 2 under the slot summary information identifies the host bus adapter (HBA) and corresponding port. Thus, in TABLE 1 the first line is displaying there is a connection for HBA in slot 4 and port 0 on this card. A double ended arrow <---> indicates a connection exists. If there was no connection an asterisk (*) is shown instead. If a port has a connection the next section shows what is at the other end of the connection. In some embodiments this is a storage shelf and the display will indicate the SAS port, shelf number, and IOM. Referring to TABLE 1, this is illustrated as [A:1.1:B*, which indicates the incoming port is port A on 1.1 (shelf 1. IOM 0). The next portion of information shows how the other ports on the IOM are connected to other device. In some embodiments, each IOM has three ports and two of the ports are displayed and referred to as outgoing ports. Referring again to TABLE 1, the incoming port is A, and the outgoing ports are B and C. If no connection is detected an asterisk (*) is used. Referring back to TABLE 1, no shelf was detected on shelf 1. IOM 0 port B. The next line (\C]<--->[Unknown device 400505b0044ee2d0) shows there is a connection on port C of this IOM. In this example, there exists SAS devices described as unknown devices followed by a SAS address. In some embodiments, these devices represent the SAS HBA ports on a partner controller. The output from each controller may be compared and if the same SAS address is present then there is a device attached through SAS and is not an error. As illustrated in TABLE 1, it is determined there is a cabling error in this example.

Referring again to FIGS. 1 and 2A-B, it should be appreciated that system 101 automatically runs the above described diagnostics that determine if the current cabling arrangement of storage array 107 is compatible with the stored cabling configuration. In addition, system 101 automatically admits, or denies admission, to the one or more storage components that are resident on storage element 105 based on whether or not cable diagnostics indicate that storage element 105 is cabled properly (e.g., that the current cabling arrangement and the stored cabling configuration are compatible). In one embodiment, the storage components can include but are not limited to solid state storage devices (e.g., flash arrays). In one embodiment, admitting a storage component can involve the admission of an SSD to storage array 107 as part of a non-disruptive upgrade for storage array 107. For example, when new SSDs are discovered by storage array 107 (after a new storage element is connected and powered on), system 101 can run a cable diagnostic check to determine if the current cable arrangement of storage array 107 is correct. If there are no cabling issues, the newly discovered SSDs can be allowed to be admitted to storage array 107. However, if there are errors, newly discovered SSDs will not be allowed to be admitted to storage array 107 and the errors may be identified or displayed for a technician. The automated diagnostics described herein can be an improvement over having a user manually run commands, because the user can choose not to run the commands or otherwise fail to run them. Moreover, performing the check as described herein not only detects the improper cabling of a storage element that has been newly added, but also determines if previously cabled storage elements are properly cabled as well.

In one embodiment, a cable diagnostic check can include the accessing of data (e.g., tabular, file, list, unstructured, etc.) to determine if a newly coupled storage element and previously coupled storage elements have been cabled to be compatible with a stored cabling configuration. In other embodiments, other manners of determining if a newly coupled storage element and a previously coupled storage element have been cabled to be compatible with a stored cabling configuration can be used. In one embodiment, the cable diagnostic check can be based on the hardware models of storage element 105, and storage array controller 103, of storage array 107. In one embodiment, the identifying can include but is not limited to generating information such as is shown in TABLES 1 and 2 for access by technician. Moreover, the information can include message or status information that can be provided by text, email, conveyed by bezel or lights, etc., via local display or over the cloud.

Storage array controller 103 manages access to storage elements 105 (e.g., manages I/O requests). As described herein, storage elements 105 can include one or more data storage components that can include but are not limited to SSDs. In one embodiment, when storage elements 105 are coupled to storage array 107 and powered on, the data storage components of storage elements 105 are discovered. Technician 111 can initiate an installation of a storage element into storage array 107 by connecting the storage element to the storage array (including cabling the storage element) and powering on the storage element. Thereafter, storage components of the storage element can be discovered by storage array 107. In one embodiment, in response to this action, system 101 can automatically run a cable diagnostic check as is described herein. Information related to the cable diagnostic check can be provided to technician 111 who can use the information to correct any errors that are found in the cabling configuration.

In some embodiments, cabling configuration plans can be placed or stored into data storage array 107 as a part of its packaging. In other embodiments, cloud assistance service 109 can maintain cabling configuration plans and provide them to data storage array 107 upon request or in an automated manner. The cabling configuration plans can be provided from other sources such as websites. Cloud assistance service 109 or other sources can provide updated or new plans when an update that affects cabling is detected. For example, cloud assistance service 109 or other sources can provide updated or new plans when upgrades to components such as storage array controller 103 and storage elements 105 are made.

Figure 3:
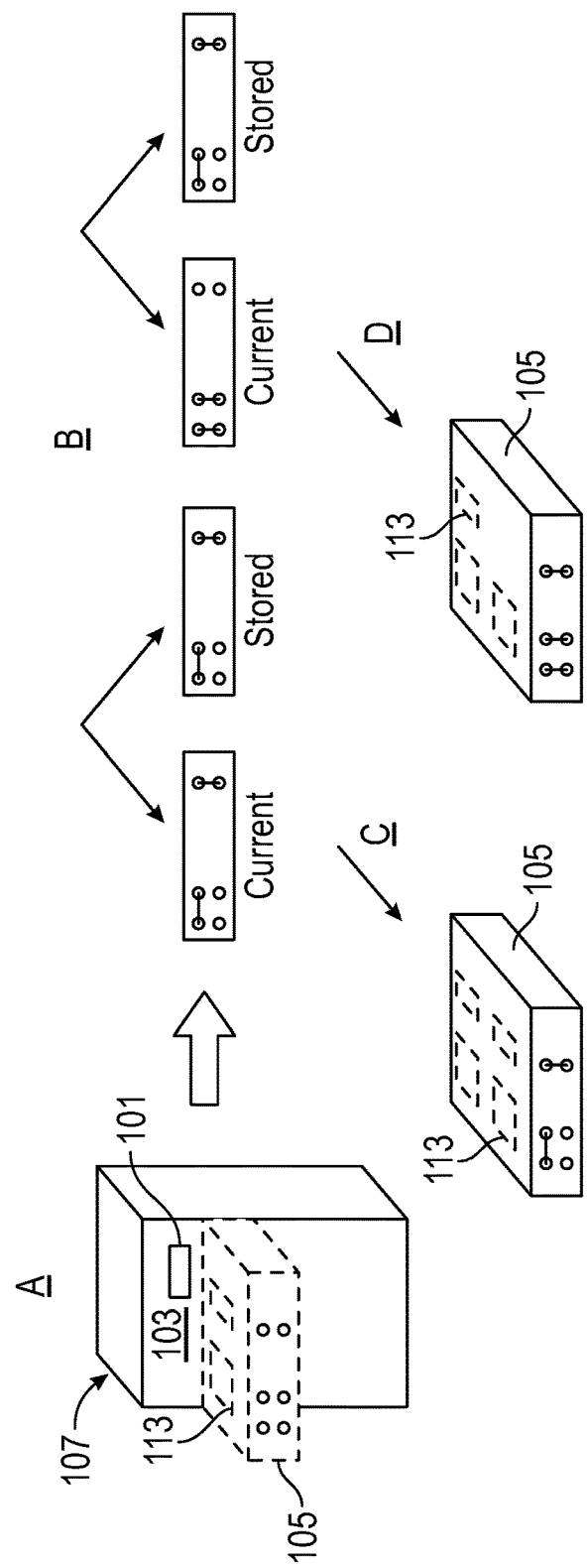
FIG. 3 illustrates operations performed as a part of a method for validating cabling for storage component admission to a storage array according to one embodiment.

FIG. 3 illustrates operations performed as a part of a method for validating cabling for storage component admission to a storage array according to one embodiment. However, it should be appreciated that other operations that are not illustrated in FIG. 3 can be performed in accordance with one embodiment.

At A, storage element 105 is installed. As part of the installation process, storage element 105 is put into place and cabling for storage element 105 is performed. In one embodiment, at this point the newly installed storage element can be powered on and its storage components 113 discovered (although they are discovered they are not admitted until the cable diagnostic check of B below indicates proper cabling). The discovery of the storage elements 105 can occur through any protocol enables to detect devices coupled to storage controller 103 upon power up in some embodiments.

At B, system 101 compares the current cabling arrangement of storage array 107 with a stored (expected) cabling configuration of the storage array. As shown in FIG. 3, the results of the comparison are used to determine whether or not a storage component 113 is admitted to storage array 107 (see C and D below). The current cabling arrangement may be determined by sending appropriate signals from controller 103 and determining an identity of a response to the signals in some embodiments.

At C, system 101 enables the admission of at least one storage component 113 of storage element 105 to the storage array 107 because the current cabling arrangement is determined to be compatible with the stored cabling configuration (see encircled storage component 113 that is admitted because the current cabling arrangement is determined to match the stored cabling arrangement). For example, the comparison found no errors as illustrated in TABLE 2 above in this embodiment.

At D, system 101 denies the admission of the at least one storage component of storage element 105 to storage array 107 because it is determined that the current cabling arrangement is incompatible with the stored cabling configuration. See storage component 113 marked with an "X" to indicate that its admission is denied because the current cabling arrangement is incompatible with the stored cabling arrangement. It should be appreciated that in some embodiments, storage element 105, which may be referred to as a storage shelf, may not be admitted in its entirety due to the detection of the incompatible cabling arrangement. As mentioned above, the storage components within storage element 105 may be solid state drives. In this embodiment, errors as illustrated in TABLE 1 may be returned to a user through a command line interface or graphical user interface.

Figure 4:
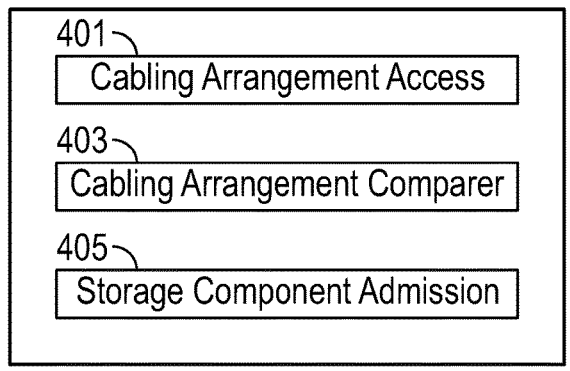
FIG. 4 shows components of a system for validating cabling for storage component admission to a storage array according to one embodiment.

FIG. 4 shows components of a system 400 for validating cabling for storage component admission to a storage array according to one embodiment. In one embodiment, the components of system 400 implement an algorithm for validating cabling for storage component admission to a storage array. The functional components of system 400 include cabling arrangement access block 401, cabling arrangement comparer 403 and storage component admission block 405.

Cabling arrangement access block 401 of FIG. 4 accesses a current cabling arrangement of the storage array (e.g., 107 in FIG. 1). In some embodiments, accessing the current cabling arrangement of the storage array is in response to a coupling of a storage element (e.g., 105 in FIG. 1) to the storage array. In other embodiments, the accessing may be triggered upon powering up the storage unit after completion of the cabling. The cabling of the storage element to the storage array that is done as a part of coupling the storage element to the storage array may be considered a part of the current cabling arrangement of the storage array.

Cabling arrangement comparer 403 of FIG. 4 compares the current cabling arrangement of the storage array with a stored cabling configuration of the storage array. In one embodiment, if the current cabling arrangement is compatible with the stored cabling configuration (e.g., a data file stored within the array or on a cloud associated with the storage array), at least one storage component of the storage element can be admitted to the storage array. In some embodiments, if the current cabling arrangement is incompatible with the stored cabling configuration, the admission of the at least one storage component of the storage element to the storage array can be denied. In one embodiment, the information that identifies errors in the current cabling arrangement can be identified and made accessible to technicians, system administrators, etc. through a report triggered upon completion of the comparison (see information shown in TABLES 1 and 2). The stored cabling configuration may be stored internally within the storage system or external to the storage system and accessed as needed.

Storage component admission block 405 of FIG. 4 admits storage components of the storage element to the storage array if the current cabling arrangement is compatible with the stored cabling configuration. In one embodiment, when a storage component is admitted to the storage array, the storage component becomes a fully operational storage component of the storage array. If the current cabling arrangement is incompatible or in some embodiments, non-optimal, a storage component or components may be denied access to the storage array.

Figure 5:
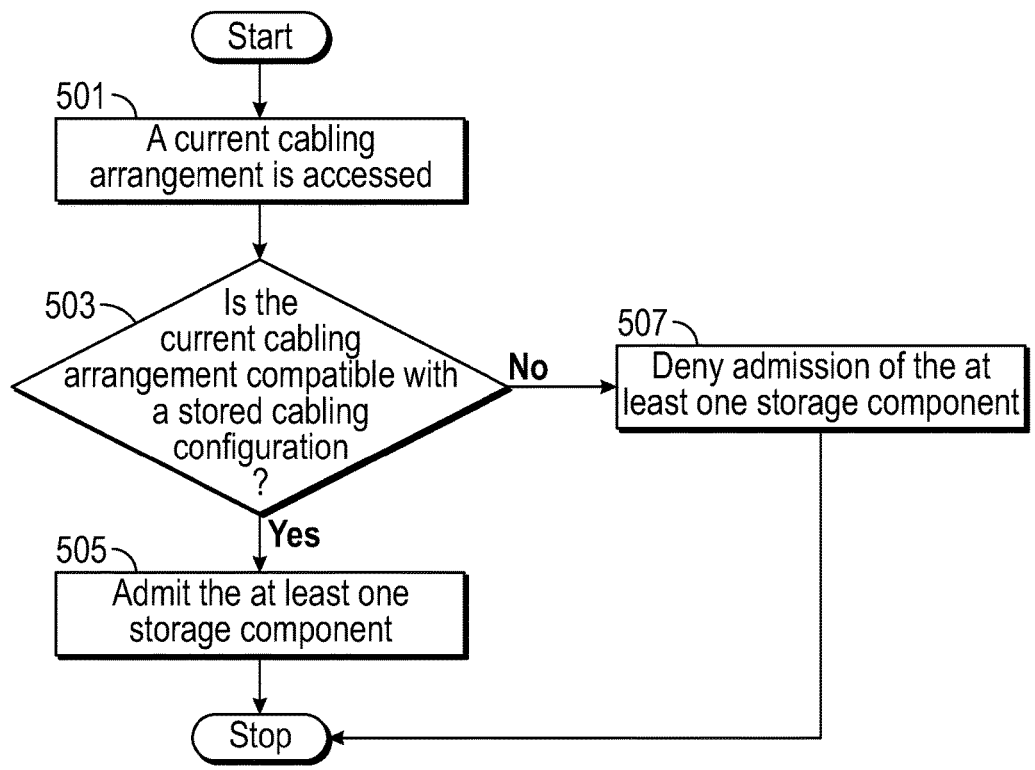
FIG. 5 shows a flowchart of a method for validating cabling for storage component admission to a storage array according to one embodiment.

FIG. 5 shows a flowchart of a method for validating cabling for storage component admission to a storage array according to one embodiment. The flowchart includes processes that, in one embodiment can be carried out by processors and electrical components under the control of computer-readable and computer-executable instructions. Although specific steps are disclosed in the flowcharts, such steps are exemplary. That is, the present embodiment is well suited to performing various other steps or variations of the steps recited in the flowchart.

Referring to FIG. 5, at 501 a current cabling arrangement is accessed. The configuration of the current cabling arrangement may be determined automatically upon powering up a system as part of discovering devices coupled to a controller and/or in response to providing a software or hardware upgrade to the storage system. At 503, it is determined if the current cabling arrangement is compatible with a stored cabling configuration. If the current cabling arrangement is compatible with the stored cabling configuration, at 505 one or more storage components is admitted to the storage array. If the current cabling arrangement is incompatible with the stored cabling configuration, at 507 admission of the at least one storage component is denied. Upon completion of the determination of the compatibility with the current cabling arrangement, a report illustrating the results of the comparison may be generated as noted above.

Figure 6:
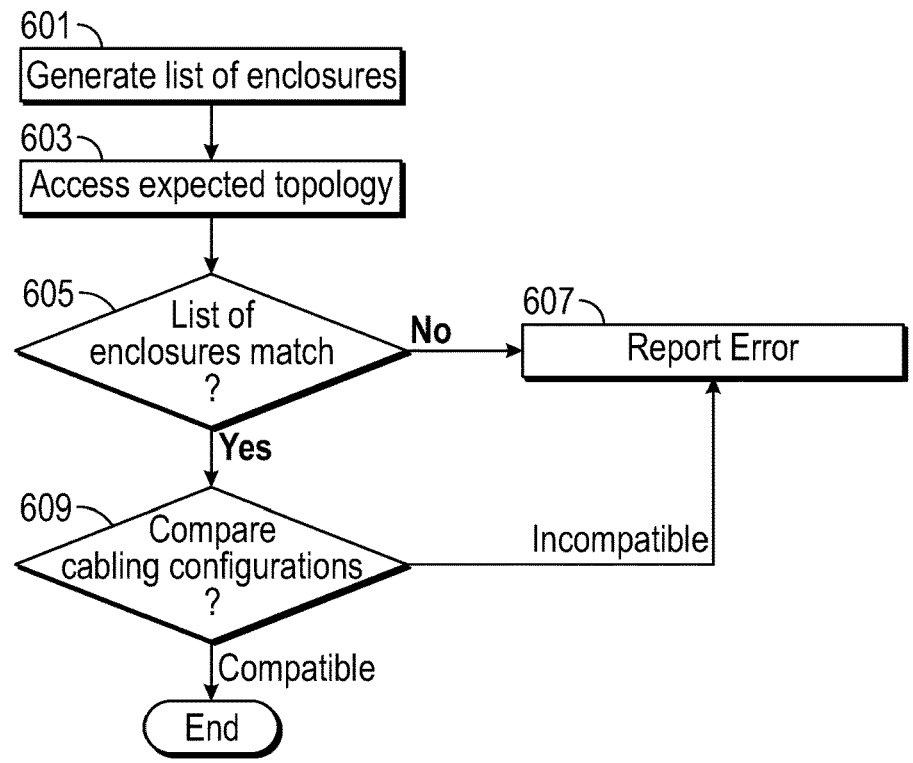
FIG. 6 is a flowchart illustrating additional details of determining whether a current cabling arrangement is compatible with a stored cabling configuration in accordance with some embodiments.

FIG. 6 is a flowchart illustrating additional details of determining whether a current cabling arrangement is compatible with a stored cabling configuration in accordance with some embodiments. The method initiates with operation 601 where a list of enclosures, which include storage elements, that are visible to the controller running the cabling validation script are generated. The controller may determine the hardware devices coupled to the controller upon startup or when triggered through the cabling validation script. In operation 603 the expected topology for the storage array is accessed. This topology may be based on hardware models upgrades provided and can be stored on the controller or external to the controller and includes the list of enclosures for the topology. Operation 605 compares the list of enclosures from the topology to the list of enclosures visible to the controller. As the controller is expected to be able to communicate with the IOM of each enclosure, i.e., each storage element/shelf, an IOM that is missing or unresponsive may indicate a cabling error and an error is returned to the user in operation 607. If it is determined that the list of enclosures visible to the controller is a match or is compatible with the expected list of enclosures from the topology then no errors are reported and the method advances to operation 609. In operation 609 the expected cabling configuration is compared to the cabling arrangement identified by the controller. As noted above the expected cabling configuration may be stored internally or externally to the controller and is associated with the hardware models of the storage system and any upgrades. Errors, or non-compatibility between the expected cabling configuration file and the current cabling arrangement as determined by the controller, are reported and result in the denial of admission of SSDs associated with the errors. Compatibility between the expected cabling configuration file and the current cabling arrangement results in the admission of the SSDs associated with the storage elements.

Figure 7:
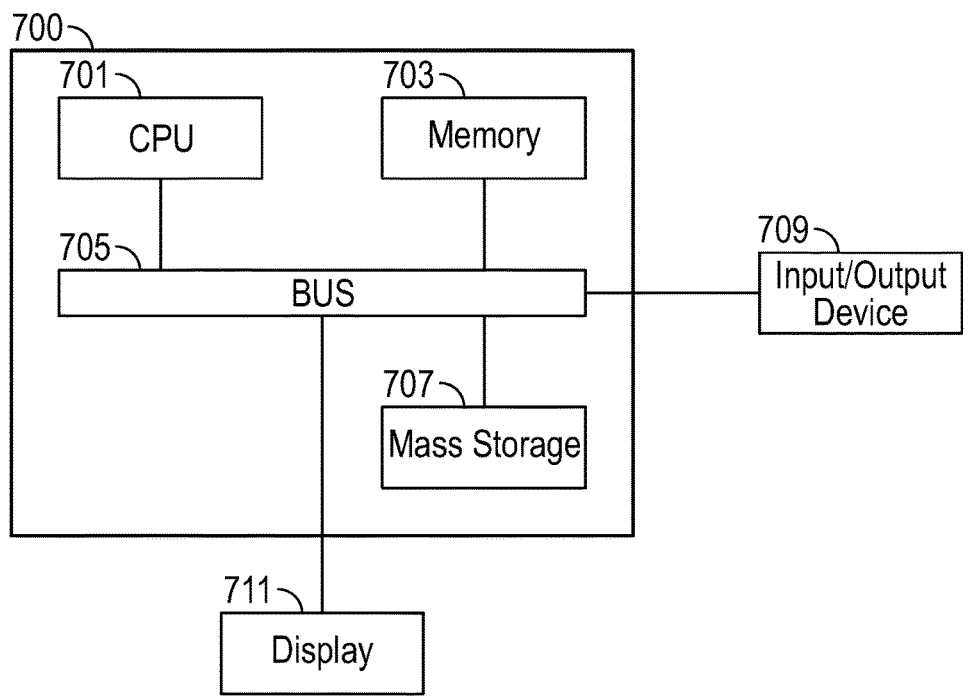
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device 700 which may implement the embodiments described herein. The computing device 700 of FIG. 7 may be used to perform embodiments of the functionality for detecting compatibility of cabling of a storage system as described herein. The computing device 700 includes a central processing unit (CPU) 701, which is coupled through a bus 705 to a memory 703, and mass storage device 707.

Mass storage device 707 represents a persistent data storage device such as a disc drive, which may be local or remote in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein as described with reference to FIGS. 1-6. The code embodying this functionality may be stored within memory 703 or mass storage device 707 for execution by a processor such as CPU 701 in some embodiments. The operating system on the computing device may be MS-WINDOWS™, OS/2™, UNIX™, LINUX™, or other known operating systems. It should be appreciated that the embodiments described herein may be integrated with virtualized computing systems also. In addition, the embodiments may be integrated or implemented as part of a cloud computing environment where remote computer resources and/or services are provisioned over a network.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments are not to be limited to the details given herein, but may be modified within the scope and equivalents of the appended claims.

What is claimed is:

1. A method for validating cabling for storage component admission to a storage array,
comprising:
in response to a coupling of a storage element to the storage array, accessing a current cabling arrangement of the storage array;
comparing the current cabling arrangement of the storage array with a stored cabling configuration file of the storage array, the stored cabling configuration file indicating an expected cabling arrangement;
determining if the current cabling arrangement is compatible with the stored cabling configuration file, and responsive to the determining, generating a report indicating a slot number within a storage shelf and a port number associated with the slot number and whether the slot number is coupled to the storage element and if the slot number is coupled to the storage element the report further includes a type of storage element and an address for the storage element.

2. The method of claim 1 wherein the comparing comprises automatically running diagnostics that determine if the current cabling arrangement of the storage array is compatible with the stored cabling configuration file and wherein the admitting is done automatically.

3. The method of claim 1 wherein the at least one storage component is a solid state storage device and wherein the method further comprises adding the solid state storage device to the storage array as part of a non-disruptive upgrade for the storage array.

4. The method of claim 1 wherein the comparing comprises accessing data to determine if the storage element and previously coupled storage elements have been cabled to be one of compatible or incompatible with the stored cabling configuration file.

5. The method of claim 1 wherein the comparing is based on hardware models for the storage element and storage array controllers.

6. The method of claim 1 further comprising, upon determining a power on state of the storage element, discovering the at least one storage component of the storage element.

7. The method of claim 1 wherein the identifying comprises generating and providing access to messages.

8. A non-transitory computer-readable storage medium having program instructions stored thereon, which when executed by at least one processor, cause the at least one processor to perform a method comprising:
in response to a coupling of a storage element to a storage array, accessing a current cabling arrangement of the storage array;
comparing the current cabling arrangement of the storage array with a stored cabling configuration file of the storage array, the stored cabling configuration file indicating an expected cabling arrangement;
determining if the current cabling arrangement is compatible with the stored cabling configuration file; and
responsive to the determining, generating a report indicating a slot number within a storage shelf and a port number associated with the slot number and whether the slot number is coupled to the storage element and if the slot number is coupled to the storage element the report further includes a type of storage element and an address for the storage element.

9. The medium of claim 8 wherein the comparing comprises automatically running diagnostics that determine if the current cabling arrangement of the storage array is compatible with the stored cabling configuration file and wherein the admitting is done automatically.

10. The medium of claim 8 wherein the at least one storage component is a solid state storage device and wherein the method further comprises adding the solid state storage device to the storage array as part of a non-disruptive upgrade for the storage array.

11. The medium of claim 8 wherein the comparing comprises accessing data to determine if the storage element and previously coupled storage elements have been cabled to be one of compatible or incompatible with the stored cabling configuration file.

12. The medium of claim 8 wherein the comparing is based on hardware models for the storage element and storage array controllers.

13. The medium of claim 8 further comprising, upon determining a power on state of the storage element, discovering the at least one storage component of the storage element.

14. The medium of claim 8 wherein the identifying comprises generating and providing access to messages.

15. A system for validating cabling for storage device admission to a storage array, the storage array having a processor configured to execute a method comprising:
   accessing a current cabling arrangement of the storage array in response to a coupling of a storage element to the storage array;
   comparing the current cabling arrangement of the storage array with a stored cabling configuration file of the storage array, the stored cabling configuration file indicating an expected cabling arrangement;
   admitting or denying at least one storage device of the storage element to the storage array responsive to a determination that the current cabling arrangement is compatible with the stored cabling configuration file, and
   generating a report indicating a slot number within a storage shelf and a port number associated with the slot number and whether the slot number is coupled to the storage element and if the slot number is coupled to the storage element the report further includes a type of storage element and an address for the storage element.

16. The system of claim 15 wherein the comparing automatically runs diagnostics that determine if the current cabling arrangement of the storage array is compatible with the stored cabling configuration file and wherein the admitting component automatically admits the at least one storage device.

17. The system of claim 15 wherein the storage component is a solid state storage device and wherein the method further comprises adding the solid state storage device to the storage array as part of a non-disruptive upgrade for the storage array.

18. The system of claim 15 wherein the comparing accesses data to determine if the storage element and previously coupled storage elements have been cabled to be one of compatible or incompatible with the stored cabling configuration file.

19. The system of claim 15 wherein the comparing makes comparisons based on hardware models for the storage element and storage array controllers.

20. The system of claim 15 further comprising:
   identifying cabling that is incompatible with the stored cabling configuration file.

* * * * *